(12) United States Patent  
Otto et al.

(10) Patent No.: US 8,985,252 B2
(45) Date of Patent: Mar. 24, 2015

(54) SPEED AND STEERING CONTROL OF A HYDRAULICALLY DRIVEN TRACTOR

(71) Applicant: MacDon Industries Ltd., Winnipeg (CA)

(72) Inventors: Phil Otto, Winnipeg (CA); Don MacGregor, Winnipeg (CA); Leonard Bergman, Winnipeg (CA)

(73) Assignee: MacDon Industries Ltd., Winnipeg, MB (CA)

( * ) Notice: Subject to any disclaimer, the term of this patent is extended or adjusted under 35 U.S.C. 154(b) by 180 days.

(21) Appl. No.: 13/681,087

(22) Filed: Nov. 19, 2012

(65) Prior Publication Data

US 2014/0138166 A1    May 22, 2014

(51) Int. Cl.
- B62D 1/22 (2006.01)
- B62D 11/04 (2006.01)
- B62D 11/00 (2006.01)

(52) U.S. Cl.
CPC ...... *B62D 11/04* (2013.01); *B62D 1/22* (2013.01); *B62D 11/001* (2013.01)
USPC ............................ 180/9.48; 180/6.3; 180/307

(58) Field of Classification Search
USPC ............................ 180/6.2, 6.3, 6.48, 305, 307
See application file for complete search history.

(56) References Cited

U.S. PATENT DOCUMENTS

| | | | |
|---|---|---|---|
| 3,988,893 A * | 11/1976 | Bojas et al. | 60/445 |
| 4,019,596 A * | 4/1977 | Crull | 180/6.48 |
| 6,601,663 B2 * | 8/2003 | Hauser | 180/6.3 |
| 6,808,036 B2 * | 10/2004 | Pellenc | 180/197 |
| 7,159,687 B2 | 1/2007 | Dunn et al. | |
| 7,188,015 B2 * | 3/2007 | Lange et al. | 701/50 |
| 7,347,277 B2 | 3/2008 | Enns | |
| 7,373,769 B2 | 5/2008 | Talbot | |
| 7,472,533 B2 | 1/2009 | Talbot | |
| 7,721,830 B2 | 5/2010 | Dunn | |
| 7,748,488 B2 | 7/2010 | Tarasinski | |
| 7,918,076 B2 | 4/2011 | Talbot | |
| 7,958,706 B2 | 6/2011 | Remillard | |
| 8,020,648 B2 | 9/2011 | Otto | |
| 8,225,903 B2 | 7/2012 | Dunn | |
| 8,245,489 B2 | 8/2012 | Talbot | |
| 2010/0120578 A1 * | 5/2010 | Bouguerra et al. | 477/1 |
| 2011/0108333 A1 * | 5/2011 | Dunn | 180/6.48 |
| 2011/0127093 A1 * | 6/2011 | Koga et al. | 180/6.24 |
| 2011/0180332 A1 * | 7/2011 | Gilbert et al. | 180/6.48 |
| 2014/0138166 A1 * | 5/2014 | Otto et al. | 180/6.48 |

FOREIGN PATENT DOCUMENTS

FR      2709454      3/1995

* cited by examiner

*Primary Examiner* — Anne Marie Boehler
*Assistant Examiner* — Maurice Williams
(74) *Attorney, Agent, or Firm* — Adrian D. Battison; Ade & Company Inc.

(57) ABSTRACT

A tractor has hydraulically driven wheels at a cab end and castor wheels at an engine end. Each driven wheels is driven by a hydraulic motor with a continuous adjustment of the motor displacement, with the motor being driven by a pump also having continuous displacement. The motor displacement is controlled by an electronic controller in response to stroking of the speed control lever to manage the displacement to provide required drive torques at different points in the stroke. There is provided an automatic steering system having a guidance controller arranged to receive GPS position information which controls the steering by differentially adjusting the displacement of the motors so that the automatic steering is independent of the manual steering which controls the pumps.

28 Claims, 7 Drawing Sheets

FIG.5    TRANSPORT 1

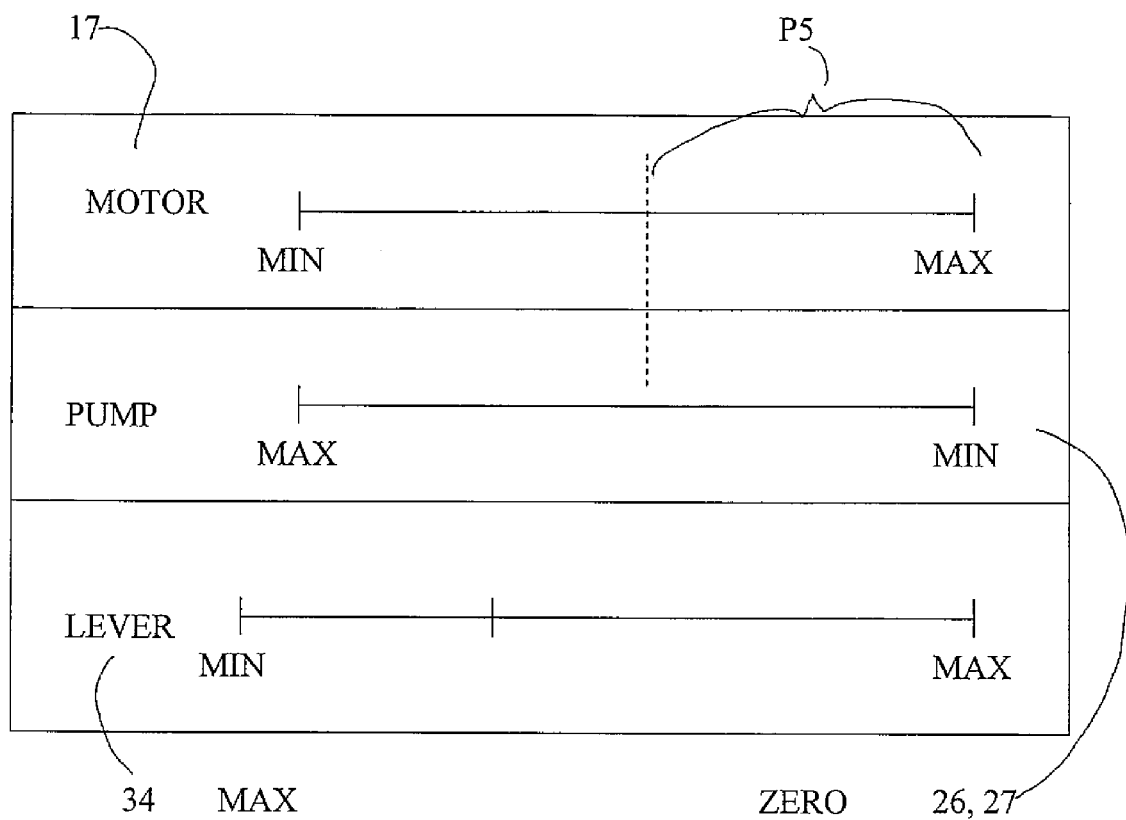
FIG. 7 DECELERATION

SPEED AND STEERING CONTROL OF A HYDRAULICALLY DRIVEN TRACTOR

This invention relates to a hydraulically driven tractor of the type, commonly but not necessarily used as a swather tractor, which is supported on a pair of hydraulically driven wheels and a pair of castor wheels and steered by a differential speed between the driven wheels.

RELATED PRIOR PATENTS

Reference is made to the following patents and applications by the same assignee, the disclosure of each of which is incorporated herein by reference as they disclose further details which may be used in the machines disclosed herein:

U.S. Pat. No. 8,245,489 (Talbot) issued Aug. 21, 2012 which discloses a combine harvester where the header is carried on gauge wheels.

U.S. Pat. No. 8,225,903 (Dunn) issued Jul. 24 200712 which discloses a tractor of the type suitable for use herein where the tractor includes a suspension system.

U.S. Pat. No. 8,020,648 (Otto) issued Sep. 20, 2011 which discloses a tractor of the type suitable for use herein where the tractor has a rear suspension.

U.S. Pat. No. 7,958,706 (Remillard) issued Jun. 14, 2011 which discloses a tractor of the type suitable for use herein where the tractor includes a reel speed control.

U.S. Pat. No. 7,918,076 (Talbot) issued Apr. 5, 2011 which discloses a header of the type suitable for use herein where the header has three sections which include a balance of lifting forces across the three sections.

U.S. Pat. No. 7,721,830 (Dunn) issued May 25, 2010 which discloses a tractor of the type suitable for use herein with steering control.

U.S. Pat. No. 7,373,769 (Talbot) issued May 20, 2008 which discloses a header with a wear shield under the cutter bar.

U.S. Pat. No. 7,347,277 (Enns) issued Mar. 25, 2008 which discloses a header with a self-contained transport system.

U.S. Pat. No. 7,472,533 (Talbot) issued Jan. 6 2009 which discloses a header with a cutter bar and draper with a seal between the draper and cutter bar.

U.S. Pat. No. 7,159,687 (Dunn) issued Jan. 9 2007 which discloses a tractor of the type suitable for use herein where the tractor carries a header across a front face thereof for movement across the field for forming a swath from a standing crop where the tractor can be reversed in direction for transport.

BACKGROUND OF THE INVENTION

Hydrostatically steered vehicles have been available for many years and their application to windrowers has been significant. There has been a limit to the transport speed of these windrowers due to instability at high speed with the drive wheels ahead of the castor wheels (cab forward). Higher speeds on the road allow the user to cover large distances without the use of trailers and tow vehicles.

Commonly used hydrostatic propulsion system for a tractor provides variable flow output by step-less or continuous alteration of pump displacement where the pump is driven by the engine at a constant speed. The motor which receives the flow from the pump can also be varied in displacement to alternate between high torque/low speed or low torque/high speed modes. The motor displacement control is typically implemented in discrete steps or ranges.

Transitioning the motor between high torque/low speed and low torque/high speed ranges while the vehicle is in motion is a desirable transmission characteristic. From a standstill and at lower speeds, high torque permits overcoming stopped vehicle inertia, rolling resistance, effort to ascend grade. When lower torque requirements exist the vehicle speed can be increased to reduce transit time or improve system efficiency by reducing the speed of the power source driving the pump.

In a dual path hydrostatic system, such as a windrower vehicle there are two independent hydrostatic systems which drive the wheels on opposite sides of the machine. By varying each wheel rotation the vehicle speed, direction, and steering is accomplished. The typical application uses a compact speed reduction gearbox that fits inside and supports the wheel. This gearbox is driven by the motor and the torque is multiplied to the level suitable for vehicle propulsion. On a dual path vehicle the gearbox ratio is typically fixed so the variable motor must provide a wide range of output speeds to accommodate high torque/low speed working operations and low torque/high speed transportation between working locations. The gearbox ratio is fixed as synchronizing a gearbox ratio shifting operation between two independent gearboxes would be difficult to maintain commanded wheel speeds and importantly steering control. Synchronizing a fixed displacement motor speed of each individual hydrostatic system to permit a mechanical ratio change of gears would be equally complex and difficult. A pair of infinitely variable ratio type gearboxes could be applied in place of or in series with a fixed gearbox, however it is easily realized this reduces the economy in application due to the complex nature of this type of mechanism.

In service braking on a dual path vehicle it is difficult to utilize common friction braking techniques as it would be complex to accurately apply the correct amount of braking torque on independently braked wheels to limit the effects on the steering control.

Motor displacement controls that shift between 2 or 3 discrete steps may rely on internal springs and forces applied by hydraulic pressure and uncontrolled flow which provides unpredictable shifting characteristics, especially to dual path applications where the hydraulic pressure is supplied in parallel to both motors. In dual path application, during motor shifting this can result in undesirable steering deviation. Discrete shifting steps also limit the flexibility to accommodate within a fixed range an infinite speed/torque setting.

SUMMARY OF THE INVENTION

It is one object of the invention to provide a tractor of the above type which has an improved drive system.

According to one aspect of the invention there is provided a hydraulically driven tractor comprising:

a tractor frame;

an engine mounted on the tractor frame;

a cab mounted on the tractor frame for a tractor driver;

a first and a second driven wheels of the tractor mounted at a driven end of the tractor, the first driven wheel including a first hydraulic drive motor for driving the first wheel and the second driven wheel including a second hydraulic drive motor for driving the second wheel;

two non-driven castor wheels of the tractor mounted at a second end of the tractor;

the driven end having mounting assemblies for supporting a crop cutting header at a position in front of the driven end and in front of the cab when the driven end is forwards;

a first and a second hydraulic pump each driven by the engine for generating a source of hydraulic fluid under pressure;

the first hydraulic pump being arranged for driving the first hydraulic motor of the first driven wheel and the second hydraulic pump arranged for driving the second hydraulic motor of the second driven wheel;

the first hydraulic pump being operable to vary the displacement of the first hydraulic pump between a minimum and a maximum to vary the flow rate of fluid generated for supply to the first hydraulic motor as the first hydraulic pump is driven;

the second hydraulic pump being operable to vary the displacement of the second pump between a minimum and a maximum to vary the flow rate of fluid generated for supply to the second hydraulic motor as the second pump is driven;

the first hydraulic drive motor having a displacement which is continuously variable between a minimum and a maximum to vary a ground speed of the first driven wheel relative to a flow rate of the fluid supplied to the first hydraulic motor;

the second hydraulic drive motor having a displacement which is continuously variable between a minimum and a maximum to vary a ground speed of the second driven wheel relative to a flow rate of the fluid supplied to the second hydraulic motor;

a steering control operable to provide a steering output between left and right positions through a center position;

a speed control operable to provide a speed output between forward and reverse positions through a neutral position; the speed control being arranged to vary the displacement of the first hydraulic pump and/or the first hydraulic motor to vary a ground speed of the first driven wheel;

the speed control being arranged to vary the displacement of the second hydraulic pump and/or the second hydraulic motor to vary a ground speed of the second driven wheel;

the speed control being arranged to vary the ground speed of the first and second driven wheels symmetrically to vary a common ground speed of the tractor;

the steering control being arranged to vary the displacement of the first hydraulic pump and/or the first hydraulic motor to vary a ground speed of the first driven wheel;

the steering control being arranged to vary the displacement of the second hydraulic pump and/or the second hydraulic motor to vary a ground speed of the second driven wheel;

the steering control being arranged to vary the ground speed of the first and second driven wheels differentially to cause steering of the tractor to a desired direction.

The step-less or continuously variable motors provides displacement control proportional to an externally supplied variable hydraulic pressure or variable current. The displacement is commanded infinitely between a maximum and minimum setting of which are mechanically limited. The default displacement setting is biased to either maximum or minimum and by applying the proportional control causes the displacement to counter the bias. There are various configurations how the motor displacement control servo may be setup; typically they can receive either a variable electrical (different types: current, voltage, or other) or hydraulic pressure signal. The default displacement, when no variable control signal is present, is physically limited to its maximum or minimum; also optionally depends on how the motor is configured. This default bias can be a result of internal springs and/or hydraulic pressure configuration. When the variable control signal is applied, it counteracts this defaulted bias and changes the displacement accordingly.

Preferably the steering control is arranged to vary the displacement of the first and second hydraulic pumps and not the first and second hydraulic motors. However it is also possible to provide steering by varying the motor displacement while leaving the pump displacement in symmetrical mode for speed control only. That is, in an alternative arrangement, preferably the steering control is arranged to vary the displacement of the first and second hydraulic motors and not the first and second hydraulic pumps.

Preferably the speed control is arranged to vary the displacement of both the first and second hydraulic pumps and the first and second hydraulic motors.

Preferably the speed control provides two separate output signals where a first output is used to control displacement of the first and second motors and second output is used to control displacement of the first and second pumps.

Preferably one of the first and second outputs is an electrical signal generated by an electrical sensor detecting movement of the speed control and the electrical signal is supplied to an electronic control system. This can be conveniently provided by a potentiometer on the speed control lever which provides an output voltage proportional to the displacement of the lever by the tractor driver.

Preferably the other of the first and second outputs is provided by a mechanical link which uses conventional drive systems to operate the mechanical stroking of the pump. A suitable arrangement for this construction is disclosed in U.S. Pat. No. 7,721,830 above.

Preferably the electronic control system includes a program arranged so that the adjustment generated by said electrical signal is not directly proportional to a position of the speed control lever.

Preferably the adjustment generated by said electrical signal is arranged to control of the adjustment of the first and second motors and not the first and second pumps. However this signal can be used instead to control the pumps.

Preferably the first output causing adjustment of the first and second motors is arranged so that the first and second motors remain at maximum displacement for a first part of the adjustment of the speed control. This acts to keep the torque applied at a maximum at lower speeds during the first part of the displacement of the speed control lever.

Preferably a length of the first part of the adjustment is selectable by the tractor driver so that the driver can select how much of the displacement of the lever is used to keep the torque high. This selection can be done based on driving conditions such as mud, hills or high crop loads which require the high torque.

Preferably the first output causing adjustment of the first and second motors is arranged so that the first and second motors are prevented from reaching the minimum displacement for a last part of the adjustment of the speed control. This acts as a maximum ground speed limiter which can be applied preferably in the working mode only so that the first and second motors reach the minimum displacement providing a maximum ground speed in the transport mode.

Preferably braking of the forward speed of the tractor is effected by returning the speed control to a zero position so that the braking to halt is effected with the first and second motors at maximum displacement which provides maximum braking torque from the engine.

Thus, utilizing the variable ratio nature of the hydrostatic system is the primary method of service braking. The level of braking torque generation is a function of motor displacement and increasing this automatically during transition from low torque/high speed to high torque/low speed without affecting steering control may allow higher vehicle speeds to be realized while maintaining legislated stopping requirements.

Preferably the speed control and the motors are arranged such that the ratio of change of displacement of the first and second motors relative to the first and second pumps is different during acceleration than during deceleration.

Preferably the speed control and the motors are arranged such that the first and second motors change displacement at the same rate as the first and second pumps for at least a part of the adjustment of the speed control during acceleration.

Preferably the speed control, the pumps and the motors are arranged such that, during deceleration, displacement of the first and second pumps reduces at a faster rate than displacement of the first and second motors increases. Decreasing the pump displacement before increasing the motor displacement reduces the capacity for negative power to be transmitted to the engine and causes more energy to be absorbed by the hydraulic system.

In general the arrangement described in more detail hereinafter provides a dual path vehicle, where the linking the control of both step-less variable displacement motors to the pump displacement provides advantage over discrete shift systems or applications that require operator intervention to manually shift displacement when motors are not in motion as they are not linked to pump displacement. In this case, the primary input of the steering system is to control the pump displacement, a control system senses the displacement setting of both pumps independent of steering command and once a reserve of pump displacement is achieved, the control system commands the motors to begin decreasing displacement from the maximum displacement bias proportional to the pump displacement. This provides a small range when pump flow is near zero for high torque/low speed control before starting transition into a lower torque/high speed mode. The control system can be adjusted by the operator to impose an artificial limit of the motor displacement permitted up to the fixed minimum displacement value, where the range from the start of transition to the limit is applied linearly when pump is at maximum displacement. Thus the control system can be effectively canceled by leaving the motor biased at maximum displacement where only high torque/low speed mode is realized such as in the transport mode.

This control scheme is applied in both acceleration/deceleration conditions and the rate of the change of the motors is independent of the rate of change of the pumps. The motor rate of change can also be different depending on the direction of transition. For example, for a predictable linear response it is desirable for the motors to change displacement at the same rate as the pump during acceleration, however during deceleration the power source may only be able to absorb a limited amount of negative power and is an advantage when the pump reduces displacement the motor increases displacement at a slower rate to allow the hydrostatic system to absorb more of the braking energy instead of transmitting it to the power source when the pump effectively becomes a motor.

It is required that the independent output of the control system and each corresponding motor displacement control system should react in unison to prevent undesirable steering deviation.

It is a further object of the present invention to utilize a drive system of the above general type where two separate steering signals can be used independently to steer the tractor. For example one signal can be provided by the manually operable steering control and the second by an automatic steering system.

According to a second aspect of the invention therefore there is provided a hydraulically driven tractor comprising:
a tractor frame;
an engine mounted on the tractor frame;
a cab mounted on the tractor frame for a tractor driver;

a first and a second driven wheels of the tractor mounted at a driven end of the tractor, the first driven wheel including a first hydraulic drive motor for driving the first wheel and the second driven wheel including a second hydraulic drive motor for driving the second wheel;

two non-driven castor wheels of the tractor mounted at a second end of the tractor;

the driven end having mounting assemblies for supporting a crop cutting header at a position in front of the driven end and in front of the cab when the driven end is forwards;

a first and a second hydraulic pump each driven by the engine for generating a source of hydraulic fluid under pressure;

the first hydraulic pump being arranged for driving the first hydraulic motor of the first driven wheel and the second hydraulic pump arranged for driving the second hydraulic motor of the second driven wheel;

the first hydraulic pump being operable to vary the displacement of the first hydraulic pump between a minimum and a maximum to vary the flow rate of fluid generated for supply to the first hydraulic motor as the first hydraulic pump is driven;

the second hydraulic pump being operable to vary the displacement of the second pump between a minimum and a maximum to vary the flow rate of fluid generated for supply to the second hydraulic motor as the second pump is driven;

the first hydraulic drive motor having a displacement which is continuously variable between a minimum and a maximum to vary a ground speed of the first driven wheel relative to a flow rate of the fluid supplied to the first hydraulic motor;

the second hydraulic drive motor having a displacement which is continuously variable between a minimum and a maximum to vary a ground speed of the second driven wheel relative to a flow rate of the fluid supplied to the second hydraulic motor;

a first steering control operable to provide a first steering output between left and right positions through a center position;

a second steering control independent of the first steering control operable to provide a second steering output between left and right positions through a center position;

a speed control operable to provide a speed output between forward and reverse positions through a neutral position;

the speed control being arranged to vary the displacement of the first hydraulic pump and/or the first hydraulic motor to vary a ground speed of the first driven wheel;

the speed control being arranged to vary the displacement of the second hydraulic pump and/or the second hydraulic motor to vary a ground speed of the second driven wheel;

the speed control being arranged to vary the ground speed of the first and second driven wheels symmetrically to vary a common ground speed of the tractor;

the first steering control being arranged to vary the displacement of the first hydraulic pump and not the first hydraulic motor to vary a ground speed of the first driven wheel;

the first steering control being arranged to vary the displacement of the second hydraulic pump and not the second hydraulic motor to vary a ground speed of the second driven wheel;

the first steering control being arranged to vary the ground speed of the first and second driven wheels differentially to cause steering of the tractor to a desired direction.

the second steering control being arranged to vary the displacement of the first hydraulic motor and not the first hydraulic pump to vary a ground speed of the first driven wheel;

the second steering control being arranged to vary the displacement of the second hydraulic motor and not the second hydraulic pump to vary a ground speed of the second driven wheel;

the second steering control being arranged to vary the ground speed of the first and second driven wheels differentially to cause steering of the tractor to a desired direction;

such that the tractor can be steered by the first steering control and by the second steering control independently of one another.

Preferably therefore one of the first second steering controls is manually operable by the tractor driver and the other of the first second steering controls is operable in response to a signal from an automatic steering system.

Thus, with each motor speed being independent within a range, this provides the ability to provide controllable steering deviation for auto-guidance applications where pump flow must remain fixed.

The arrangement described herein thus provides an arrangement to control differential automatic steering of the tractor without a valve, cylinders & linkage conventionally used to control pumps on a hydrostatically propelled machine, thus reducing number of parts. It also provides a more direct input closer to the final output to the tires which eliminates deflections in linkages/isolators resulting in more precise control of the tractor, even at higher speeds that machines are currently traveling. This method will allow the steering wheel to be stationary when the automatic steering is engaged.

The position of the servos in the wheel motors that control the displacement (and thus determine ground speed) are independently controlled by variable current from the controls system. When traveling at higher speeds (such as when cutting with disk header or driving on the road) the displacement of both motors is controlled in unison. When auto-steering is engaged the displacement of the motors is controlled independently based on GPS signals received by a conventional auto-steer antenna, which transmits the signal to an electronic control module which sends a variable signal to the motor servo control to change the displacement of the motor to steer the machine in the desired path. The variable signal could either be electrical or hydraulic, depending on the type of motor displacement control; not limited to current.

Commonly used hydrostatic propulsion system for a work vehicle provides variable flow output by step-less alteration of pump displacement where the pump is driven by a power source at constant speed. The motor which receives the flow from the pump can also be varied in displacement to alternate between high torque/low speed or low torque/high speed modes. The method of motor displacement control can implemented in discrete steps or be infinitely varied between a maximum, and in some motor designs an infinitely minimum value.

BRIEF DESCRIPTION OF THE DRAWINGS

One embodiment of the invention will now be described in conjunction with the accompanying drawings in which:

FIGS. 5, 6 and 7 show schematically the relationship between the speed control lever, the pump displacement and the motor displacement for three separate conditions which are acceleration during transport mode, acceleration during working mode and deceleration in either mode.

In the drawings like characters of reference indicate corresponding parts in the different figures.

DETAILED DESCRIPTION

Figure 1:
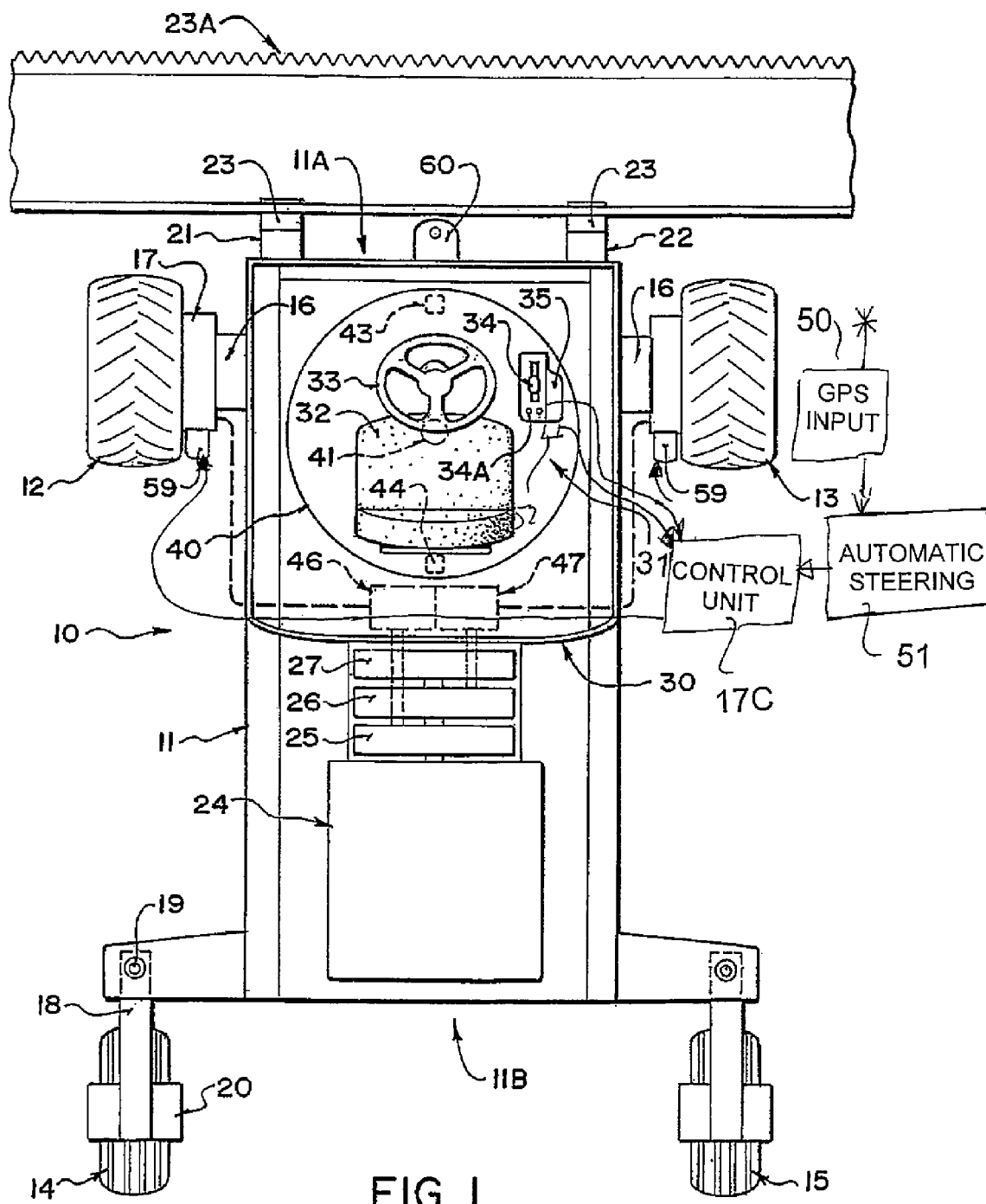
FIG. 1 is a top plan view partly in phantom and partly broken away showing a tractor of the type with which the present invention is concerned in the cab forward position and showing the steering and speed control system of the present invention.

A swather tractor generally indicated at 10 includes a frame 11 which is carried on a first pair of driven ground wheels 12 and 13 and on a second pair of non-driven castor wheels 14 and 15. The driven wheels 12 and 13 are mounted on suitable supports 16 which support the ground wheels from the frame 11. The driven ground wheels 12 and 13 are each driven by a hydraulic motor 17 carried on the support 16 which receives hydraulic fluid under pressure from a supply line and drives the ground wheel at a rate of rotation dependant upon the rate of flow of the hydraulic fluid. The displacement of the motors 17 is adjustable by a servo 17A and 17B which act to cause step-less or continuous adjustment of the displacement over a range between a maximum position in which the wheel moves at minimum ground speed for a certain flow rate of the fluid and a minimum position in which the wheel moves at maximum ground speed for a certain flow rate of the fluid. The servos 17A and 17B are controlled by a control unit 17C as described in more detail hereinafter.

The wheels 14 and 15 are mounted on conventional castors 18 which swivel about a castor pin 19. The ground wheels 14 and 15 are non driven and are simply mounted in a supporting bracket 20 which can pivot around the castor pin 19 so that the castor wheels follow the movement of the vehicle as controlled by the driven wheels 12 and 13. Thus the speed of the vehicle over the ground is controlled by the rate of rotation of the wheels 12 and 13 and steering is controlled by a differential in speed between the wheels 12 and 13.

The frame is shown only schematically since this can vary widely in accordance with requirements as is well known to a person skilled in this art. At the driven end 11A of the frame is mounted suitable supports 21 and 22 for carrying a header 23. Again these elements are well known to persons skilled in this art and various different designs can be used. Thus the support elements 21, 22 on the header carried thereby are shown only schematically. Various different types of headers can be used including disc type cutters or sickle knife cutters 23A. The width of the header can vary considerably depending upon the type of crop and the cutting system employed. The header is preferably carried on the tractor rather than on separate supports and the tractor includes a lifting mechanism schematically indicated at 23 operable to raise and lower the header on the tractor between different working positions and between working positions and a raised position cleared from the ground for moving the header over the ground when not in working position.

The tractor includes an engine 24 carried on the frame 11 adjacent a second end 11B of the frame. The engine is arranged to drive a series of pumps 25, 26 and 27 for generating pressurized hydraulic fluid for driving the various components of the tractor as described hereinafter. Separate pumps can be used as shown or single pump can be used with the hydraulic fluid under pressure generated thereby being separated into separate controlled fluid paths for operating the various components.

At the driven end 11A of the frame is provided a cab 30 which sits over the driven end between the driven wheels 12 and 13 so the operator can look over the header during the operating action on the field. The cab 30 encloses an operator console generally indicated at 31 which includes a seat 32, a steering control 33 in the form of a conventional steering wheel, a speed control 34 and an accessory control 35. The steering wheel 33 is of a conventional nature and is mounted in the console in front of the seat by suitable mounting arrangements which allow the operator to enter the seat and be comfortably located on the seat behind the steering wheel. To the right hand of the operator is provided a speed control 34 generally in the form of a lever which can pivot forwardly and rearwardly between a reverse position at the rear, a neutral position at the center and a forward position at the front. In an intuitive manner, therefore, the operator can pull rearwardly on the lever for reverse and push forwardly on the lever for forward movement with the rate of the movement being controlled by the relative position of the lever along its sliding action. The speed control 34 has a first output 34A in the form of a mechanical linkage and a second output 34B in the form of an electrical signal generated for example by a potentiometer at the lever.

To the right hand of the operator, on the same lever as the speed control for convenient access to the operator's hand, is provided the accessory control 35.

Many of the above components are well known and conventional and can be found in many different designs of such tractors manufactured by a number of manufacturers including the present assignee. Further details of many of the components are described in the above listed related patents.

In the arrangement shown in this application, the operator console 31 including the operator seat 32, the steering wheel 33, the speed control 34 and the accessory control 35 are all carried on a platform or base plate 40 carried by the cab on top of the frame 11. The base plate 40 can rotate on a support shaft 41 about a vertical axis 42 between a first position shown in FIG. 1 where the seat faces the driven end 11A to the second position shown in FIG. 2 in which the seat faces the engine end 11B. These positions are known herein as "cab forward" in which the cab 30 is located at the forward end of the tractor as it moves with the end 11A at the front and "engine forward" in which the end 11B is at the front and moves forwardly.

The positioning of the platform in the two positions is detected by a pair of switches 43 and 44 which co-operate with an element 44A carried on the platform. Thus only when the platform and the seating console are properly located and fixed in one of the selected positions, is this position detected by the respective switch 43, 44 which is used in the control system as set forth hereinafter. The speed control 34 and the accessory control 35 and the display board 32A are fixed relative to the seat and the platform so that they rotate with the platform. Thus the operator, in both positions has the controls arranged exactly in the same position for operation in an exactly symmetrical manner. Thus the speed control works in the same manner in that rearward drives the vehicle toward the rear of the operator as the operator sees at the time and forward movement of the lever drives the lever forwardly in the orientation of the operator at the time. Mechanical and electrical coupling extend from the control systems including the steering, speed control and accessory control from the platform, through the support shaft 41 to a position underneath the frame where those communicating mechanical and electrical links cooperate with the relevant structures underneath the vehicle for controlling the movement of the vehicle. It will be appreciated that, when the operator is in the cab forward position shown in FIG. 1, movement of the speed control lever toward the end 11A moves the vehicle in the direction of the end 11A. When the seat is reversed, movement of the same lever in a direction away from the operator moves the lever toward the end 11B and must operate the tractor to move the vehicle along the direction toward the end 11B. This requires the linkage to be reversed since the effect of the lever must be reversed as the seat is rotated from one position to the other. This can be achieved by mechanical linkage or can be achieved by electrical and/or hydraulic connections as will be apparent to one skilled in the art.

Figure 2:
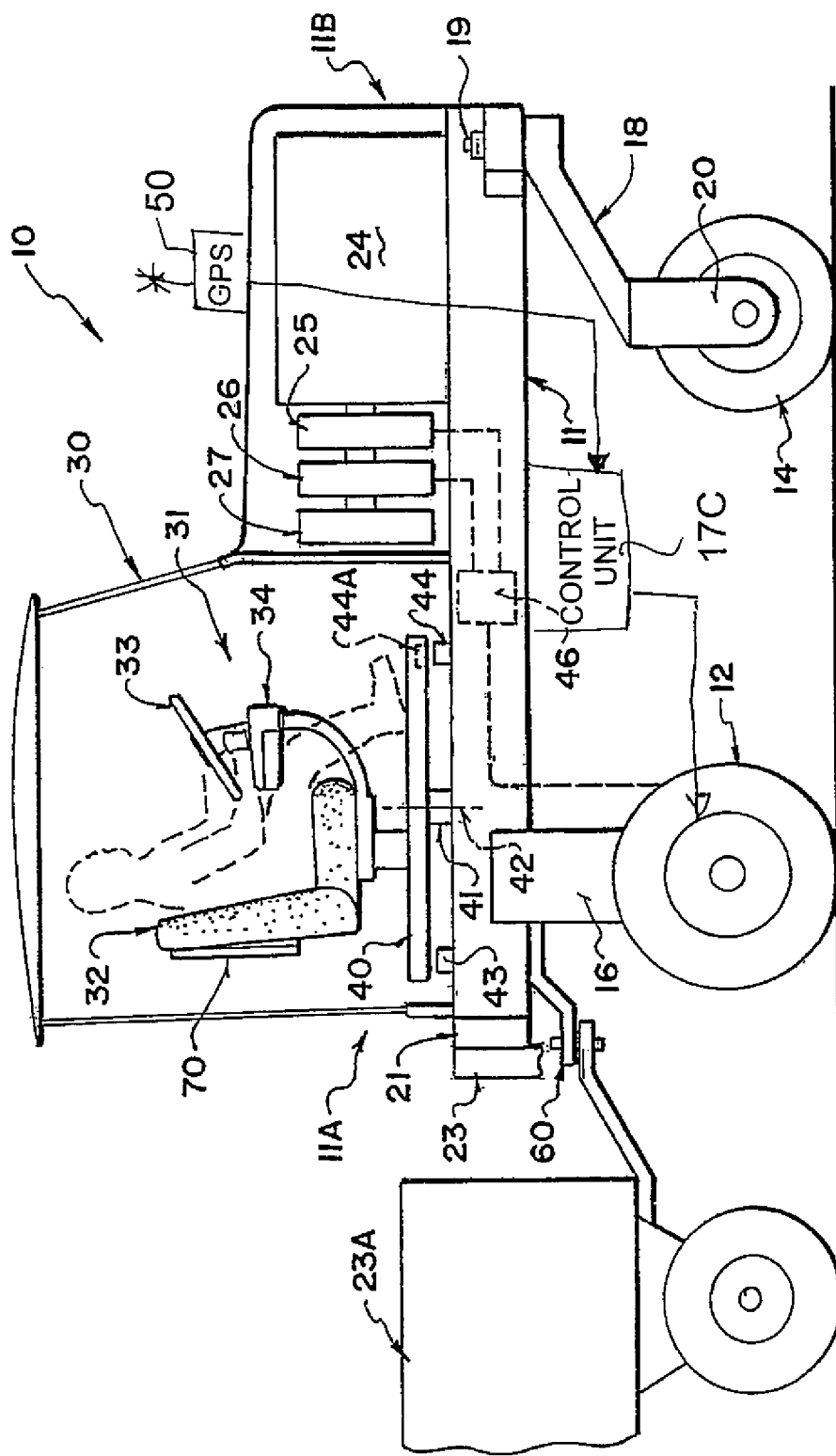
FIG. 2 is a side elevational view of the tractor of FIG. 1 in which the operator's seat and console have been rotated for operating the tractor in an engine forward position.
Figure 3:
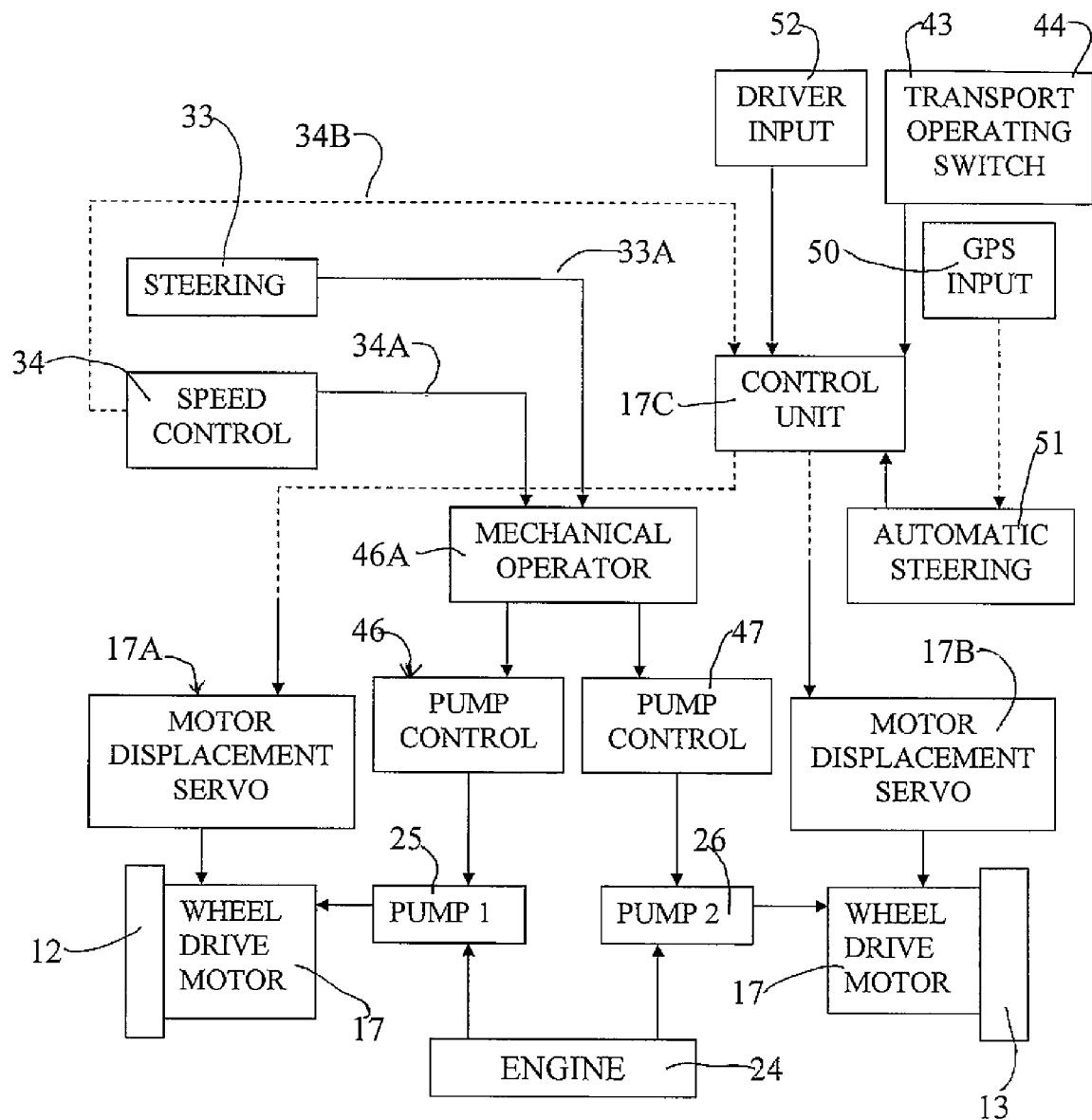
FIG. 3 is a schematic illustration of the control system for the tractor of FIG. 1.
Figure 4:
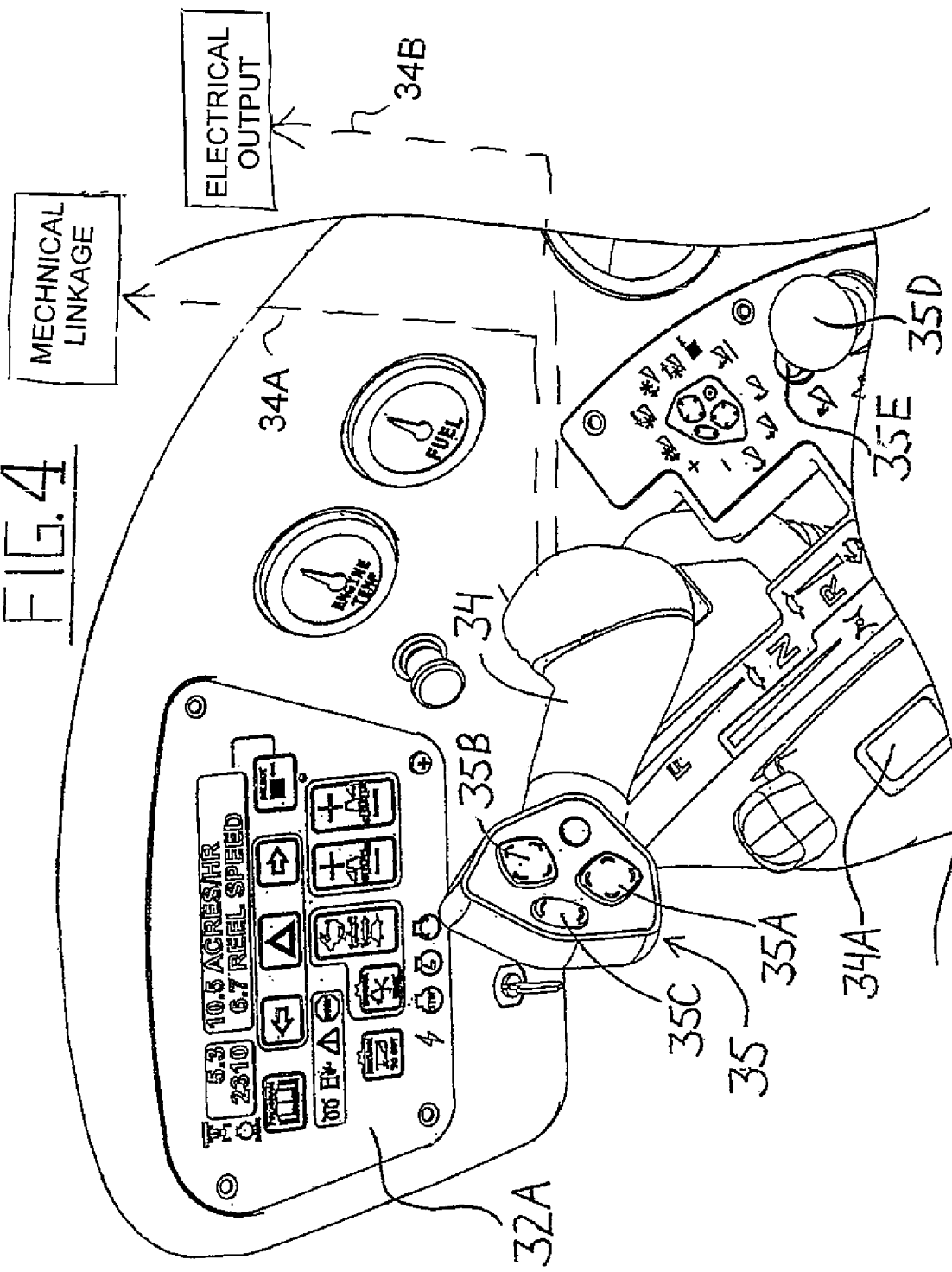
FIG. 4 is a top plan view of the control elements of the console of FIGS. 1, 2 and 3 showing the controls for the system of the present invention.

The mechanical section is shown in FIG. 1 and the schematic control system is shown in FIG. 3. The speed control system 34 controls through the linkage 34A the pumps 25 and 26 through pump controls 46 and 47. The pump 25 supplies fluid to the drive motor 17 of the wheel 12. The pump 26 supplies fluid to the motor 17 of the wheel 13. The pumps are controlled to control the displacement of the pumps and therefore the amount of fluid generated in conventional manner. The rate of flow of fluid controls the rate of rotation of the respective motor so that the wheels rotate at a selected speed determined by the control of the pumps 25 and 26. The linkage 34A communicates with a linkage operator 46A which is designed to provide the required operation of the controls 46, 47. An example of the arrangement of this operator is shown in the above referenced U.S. Pat. No. 7,721,830.

In addition the steering 33 controls the pumps 25 and 26 to generate a differential in the flow thereof so as to generate a differential in the speed of the motors 17. In the schematic illustration of a system shown in FIG. 3, this operation is shown as effected by a mechanical link 33A extending to the operator 46A so that the operator uses the input from the link 34A and from the link 33A to control the pumps 25 and 26 to control propulsion and steering in the manner set out for example in the above patent.

As shown in FIG. 3 the control unit 17C is also responsive to input from the seat switch sensors 43 and 44 so that operation of many of the systems shown in FIG. 3 is only possible when the seat switch is actuated indicating that the platform is in a selected one of the two positions. In addition the indication from the respective seat switch of the selected position of the seat console is entered into the control unit to control the operation of the tractor in dependence of the cab forward or engine forward orientation, that is whether the tractor is in working mode or in transport mode.

A GPS location system 50 provides an input to an automatic steering module 51 which provides control signals to the control unit 17A. In this way the direction of the tractor can be controlled as set out hereinafter by the automatic steering independently of the mechanical control provided by the linkage operator 46A and the pump controls 46 and 47.

The steering control 33 is arranged to vary the displacement of the hydraulic pumps not the hydraulic motors to vary a ground speed of the driven wheels differentially to cause steering of the tractor to a desired direction.

Thus the steering control 33 is arranged to vary the displacement of the first and second hydraulic pumps and not the first and second hydraulic motors. The automatic steering control 51 is arranged to vary the motor displacement while leaving the pump displacement in symmetrical mode for speed control only.

Figure 5:
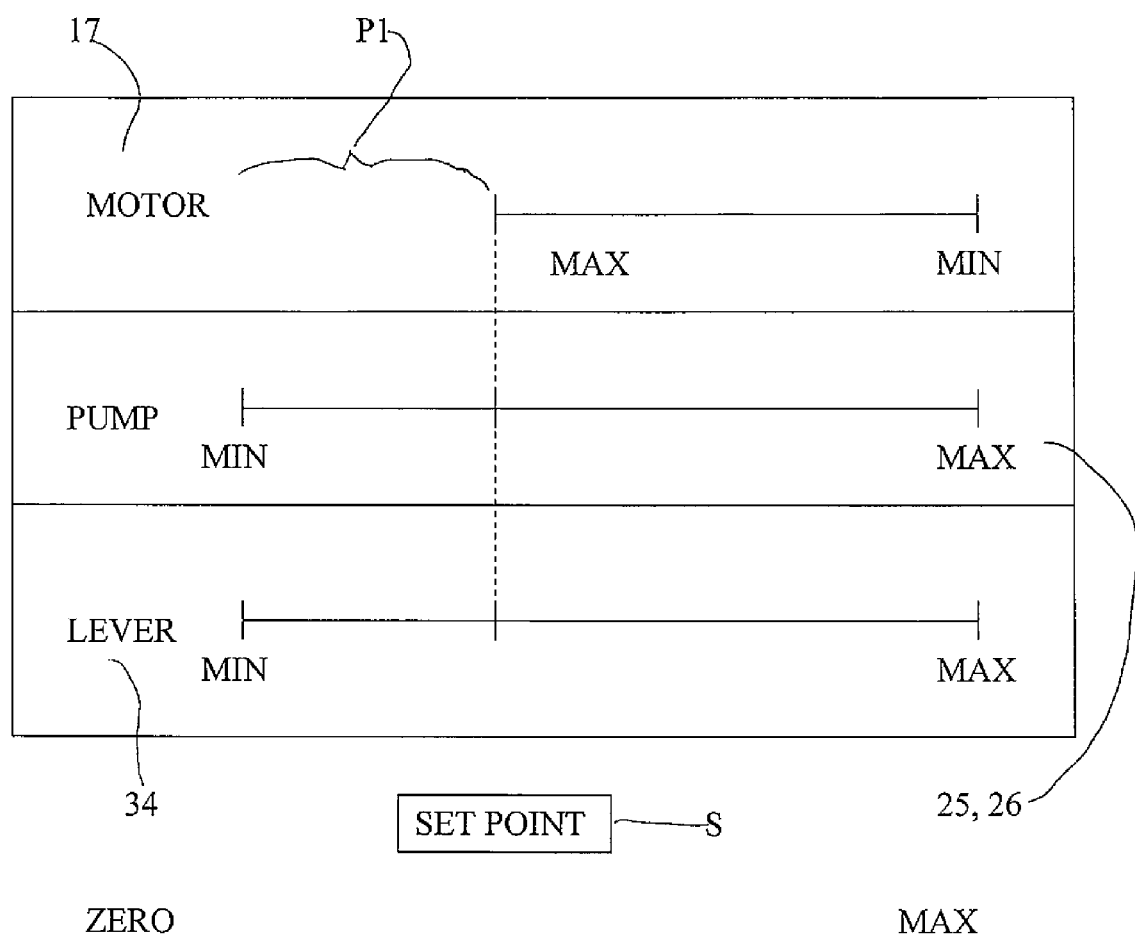

Turning now to FIG. 5, the speed control lever 34 provides the control as described above of the first and a second hydraulic pumps 25, 26 to vary the displacement between a minimum and a maximum to vary the flow rate of fluid generated for supply to the first hydraulic motor as the first hydraulic pump is driven.

Each of the hydraulic drive motors 17 has a displacement which is continuously variable between a minimum and a maximum to vary a ground speed of the first driven wheel relative to a flow rate of the fluid supplied to the first hydraulic motor.

The speed control lever 34 is operable to provide a speed output between reverse position and a forward position shown in FIG. 5 through a neutral position.

The speed control lever 34 is arranged to vary the displacement of both the hydraulic pumps 25, 26 and the hydraulic motors 17 to vary a ground speed of the driven wheel symmetrically to vary a common ground speed of the tractor by providing two separate output signals 34A, 34B where the first output 34B is used to control displacement of the first and second motors and the second output 34A is used to control displacement of the first and second pumps.

The first and second outputs is an electrical signal generated by the electrical sensor detecting movement of the speed control and can be conveniently provided by a potentiometer on the speed control lever which provides an output voltage proportional to the displacement of the lever by the tractor driver.

The second output is provided by the mechanical link 34A which uses conventional drive systems to operate the mechanical stroking of the pump. As shown in FIG. 5, the electronic control system 17C includes a program arranged so that the adjustment generated by said electrical signal is not directly proportional to a position of the speed control lever.

Figure 6:
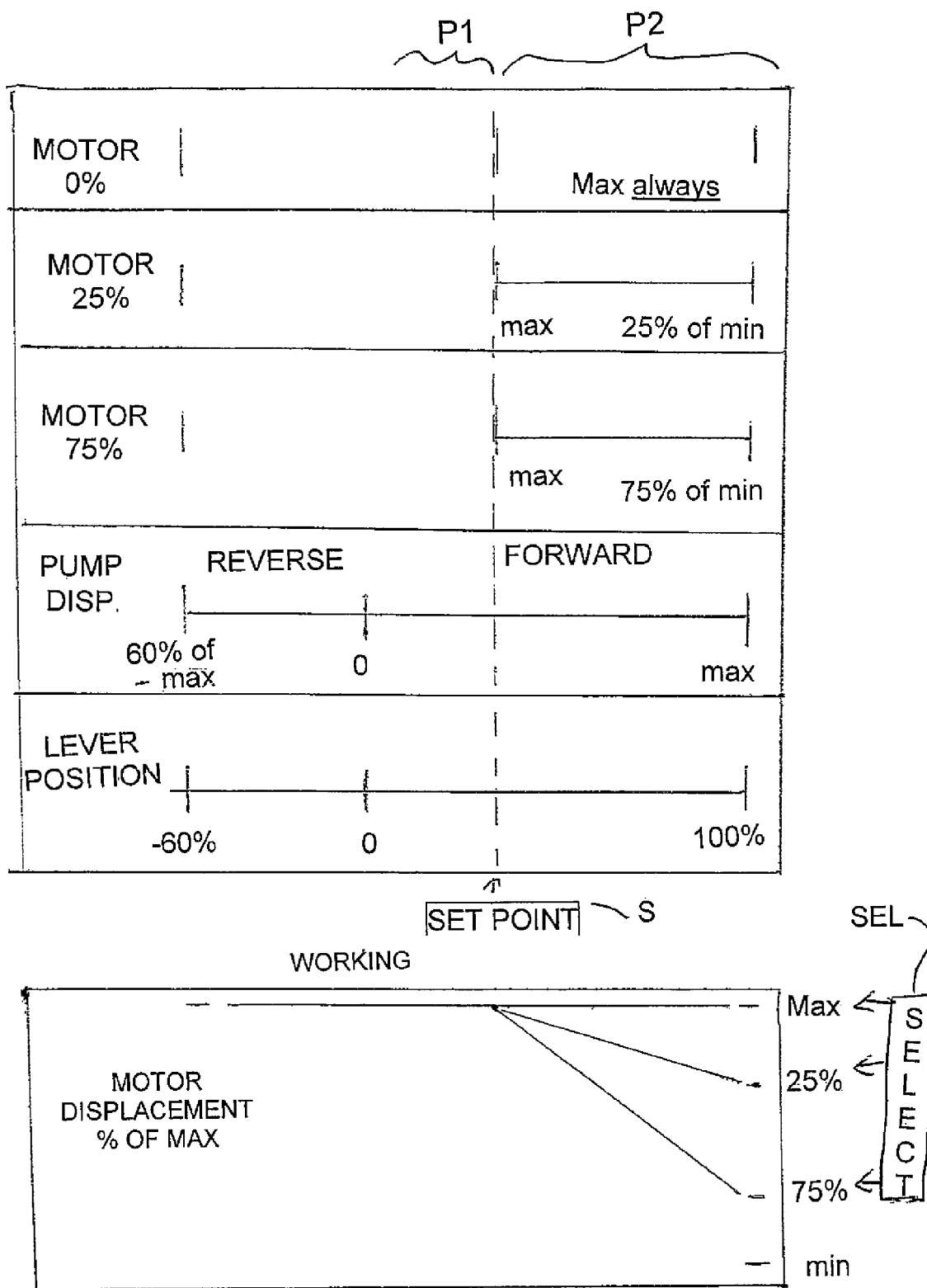

As shown in FIG. 6. the control system can be adjusted by the operator as shown at SEL to impose an artificial limit of the motor displacement permitted up to the fixed minimum displacement value, where the range from the start of transition to the limit is applied linearly when pump is at maximum displacement. Thus the control system can be effectively canceled by leaving the motor biased at maximum displacement where only high torque/low speed mode is realized such as in the transport mode.

This rate of the change of the motors is thus independent of the rate of change of the pumps. The rate of change of the motor can also be different depending on the direction of transition. For example, for a predictable linear response it is desirable for the motors to change displacement at the same rate as the pump during acceleration. However during deceleration as shown in FIG. 7 at P5, the power source may only be able to absorb a limited amount of negative power and is an advantage, when the pump reduces displacement, that the motor increases displacement at a slower rate than the pumps to allow the hydrostatic system to absorb more of the braking energy instead of transmitting it to the power source when the pump effectively becomes a motor.

Thus in FIG. 6 is shown a scheme for the motor displacement change which occurs based on pump/lever position. Thus as shown, the first part of the adjustment P1 and P2 is not operator adjustable but set in the control program to be some arbitrary set point S as shown, at say 30% between 0 and 100% of the pump/lever setting. The operator is however able to adjust as shown at SEL the motor's minimum limit from 0% (motor maximum displacement) to something less than 100% (motor minimum displacement) in the working mode, which is applied linearly to the pump/lever range starting at the set point S.

As shown in FIG. 5, the first output 34B causing adjustment of the first and second motors is arranged so that the first and second motors remain at maximum displacement for a first part P1 of the adjustment of the speed control lever. This acts to keep the torque applied at a maximum at lower speeds during the first part P1 of the displacement of the speed control lever.

Also the first output 34B causing adjustment of the first and second motors 17 is arranged as shown in FIG. 6 so that the motors are prevented from reaching the minimum displacement. Thus at reduced level, the motors are held back from the minimum displacement by a percentage of the order of say 25% or 75%. This acts as a maximum ground speed limiter which can be applied preferably in the working mode only of FIG. 6 so that the first and second motors reach the minimum displacement providing a maximum ground speed in the transport mode as shown in the higher speed transport position of FIG. 5.

As shown in the deceleration diagram of FIG. 7, braking of the forward speed of the tractor is effected by returning the speed control to a zero position so that the braking to halt is effected with the first and second motors 17 at maximum displacement which provides maximum braking torque from the engine.

Thus, the level of braking torque generation is a function of motor displacement and increasing this automatically during transition from low torque/high speed to high torque/low speed without affecting steering control allows higher vehicle speeds to be realized while maintaining legislated stopping requirements.

As can be seen by comparing FIGS. 5 and 7, the speed control and the motors are arranged such that the ratio of change of displacement of the first and second motors relative to the first and second pumps is different during acceleration than during deceleration.

Typically the speed control and the motors are arranged in a part of the stroke of the lever 34 such that the first and second motors change displacement at the same rate as the first and second pumps for a part of the adjustment of the speed control during acceleration.

As shown in FIG. 7, the speed control, the pumps and the motors are arranged such that, during a part of the deceleration, displacement of the first and second pumps reduces at a faster rate than displacement of the first and second motors increases.

The invention claimed is:

1. A hydraulically driven tractor comprising:
a tractor frame;
an engine mounted on the tractor frame;
a cab mounted on the tractor frame for a tractor driver;
a first and a second driven wheels of the tractor mounted at a driven end of the tractor, the first driven wheel including a first hydraulic drive motor for driving the first wheel and the second driven wheel including a second hydraulic drive motor for driving the second wheel;
two non-driven castor wheels of the tractor mounted at a second end of the tractor;
the driven end having mounting assemblies for supporting a crop cutting header at a position in front of the driven end and in front of the cab when the driven end is forwards;
a first and a second hydraulic pump each driven by the engine for generating a source of hydraulic fluid under pressure;
the first hydraulic pump being arranged for driving the first hydraulic motor of the first driven wheel and the second hydraulic pump arranged for driving the second hydraulic motor of the second driven wheel;
the first hydraulic pump being operable to vary the displacement of the first hydraulic pump between a minimum and a maximum to vary the flow rate of fluid generated for supply to the first hydraulic motor as the first hydraulic pump is driven;

the second hydraulic pump being operable to vary the displacement of the second pump between a minimum and a maximum to vary the flow rate of fluid generated for supply to the second hydraulic motor as the second pump is driven;

the first hydraulic drive motor having a displacement control actuator which is operable by a control unit so as to provide continuous stepless adjustment of the displacement of the first hydraulic drive motor between a minimum and a maximum to vary a ground speed of the first driven wheel relative to a flow rate of the fluid supplied to the first hydraulic motor;

the second hydraulic drive motor having a displacement control actuator which is operable by a control unit so as to provide continuous stepless adjustment of the displacement of the second hydraulic drive motor between a minimum and a maximum to vary a ground speed of the second driven wheel relative to a flow rate of the fluid supplied to the second hydraulic motor;

a steering control operable to provide a steering output between left and right positions through a center position;

a speed control operable to provide a speed output between forward and reverse positions through a neutral position;

the speed control to vary the displacement of the first hydraulic pump and/or the first hydraulic motor to vary a ground speed of the first driven wheel;

the speed control being arranged to vary the displacement of the second hydraulic pump and/or the second hydraulic motor to vary a ground speed of the second driven wheel;

the speed control being arranged to vary the ground speed of the first and second driven wheels symmetrically to vary a common ground speed of the tractor;

the steering control being arranged to vary the displacement of the first hydraulic pump and not the first hydraulic motor to vary a ground speed of the first driven wheel;

the steering control being arranged to vary the displacement of the second hydraulic pump and not the second hydraulic motor to vary a ground speed of the second driven wheel;

the steering control being arranged to vary the ground speed of the first and second driven wheels differentially to cause steering of the tractor to a desired direction.

2. The tractor according to claim 1 wherein the speed control is arranged to vary the displacement of both the first and second hydraulic pumps and the first and second hydraulic motors.

3. The tractor according to claim 1 wherein the speed control provides a first output to control displacement of the first and second motors and second output to control displacement of the first and second pumps.

4. The tractor according to claim 3 wherein the first output causing adjustment of the first and second motors is arranged so that the first and second motors remain at maximum displacement for a first part of the adjustment of the speed control.

5. The tractor according to claim 3 wherein the first output causing adjustment of the first and second motors is arranged so that the first and second motors are arranged to reach only a set displacement less than the minimum displacement.

6. The tractor according to claim 5 wherein the set displacement is selectable by the tractor driver.

7. The tractor according to claim 5 wherein the tractor is operable in working and transport modes and wherein the first output causing adjustment of the first and second motors is arranged so that the first and second motors are prevented from reaching the minimum displacement in the working mode only so that the first and second motors reach the minimum displacement in the transport mode.

8. The tractor according to claim 1 wherein the speed control and the motors are arranged such that the first and second motors change displacement at the same rate as the first and second pumps for at least a part of the adjustment of the speed control during acceleration.

9. The tractor according to claim 1 wherein the speed control, the pumps and the motors are arranged such that, during deceleration, displacement of the first and second pumps reduces at a faster rate than displacement of the first and second motors increases.

10. A hydraulically driven tractor comprising:
a tractor frame;
an engine mounted on the tractor frame;
a cab mounted on the tractor frame for a tractor driver;
a first and a second driven wheels of the tractor mounted at a driven end of the tractor, the first driven wheel including a first hydraulic drive motor for driving the first wheel and the second driven wheel including a second hydraulic drive motor for driving the second wheel;
two non-driven castor wheels of the tractor mounted at a second end of the tractor;
the driven end having mounting assemblies for supporting a crop cutting header at a position in front of the driven end and in front of the cab when the driven end is forwards;
a first and a second hydraulic pump each driven by the engine for generating a source of hydraulic fluid under pressure;
the first hydraulic pump being arranged for driving the first hydraulic motor of the first driven wheel and the second hydraulic pump arranged for driving the second hydraulic motor of the second driven wheel;
the first hydraulic pump being operable to vary the displacement of the first hydraulic pump between a minimum and a maximum to vary the flow rate of fluid generated for supply to the first hydraulic motor as the first hydraulic pump is driven;
the second hydraulic pump being operable to vary the displacement of the second pump between a minimum and a maximum to vary the flow rate of fluid generated for supply to the second hydraulic motor as the second pump is driven;
the first hydraulic drive motor having a displacement control actuator which is operable by a control unit so as to provide continuous stepless adjustment of the displacement of the first hydraulic drive motor between a minimum and a maximum to vary a ground speed of the first driven wheel relative to a flow rate of the fluid supplied to the first hydraulic motor;
the second hydraulic drive motor having a displacement control actuator which is operable by a control unit so as to provide continuous stepless adjustment of the displacement of the second hydraulic drive motor between a minimum and a maximum to vary a ground speed of the second driven wheel relative to a flow rate of the fluid supplied to the second hydraulic motor;
a steering control operable to provide a steering output between left and right positions through a center position;

a speed control operable to provide a speed output between forward and reverse positions through a neutral position;
the speed control being arranged to vary the displacement of the first hydraulic pump and/or the first hydraulic motor to vary a ground speed of the first driven wheel;
the speed control being arranged to vary the displacement of the second hydraulic pump and/or the second hydraulic motor to vary a ground speed of the second driven wheel;
the speed control being arranged to vary the ground speed of the first and second driven wheels symmetrically to vary a common ground speed of the tractor;
the steering control being arranged to vary the displacement of the first hydraulic motor and/or the first hydraulic pump to vary a ground speed of the first driven wheel;
the steering control being arranged to vary the displacement of the second hydraulic motor and/or the second hydraulic pump to vary a ground speed of the second driven wheel;
the steering control being arranged to vary the ground speed of the first and second driven wheels differentially to cause steering of the tractor to a desired direction;
wherein the speed control provides a first output to control displacement of the first and second motors and second output to control displacement of the first and second pumps;
wherein one of the first and second outputs is an electrical signal generated by an electrical sensor detecting movement of the speed control and wherein the electrical signal is supplied to an electronic control system.

11. The tractor according to claim 10 wherein the other of the first and second outputs is provided by a mechanical link.

12. The tractor according to claim 10 wherein the electronic control system includes a program arranged so that the adjustment generated by said electrical signal is not directly proportional to a position of the speed control.

13. The tractor according to claim 12 wherein the adjustment generated by said electrical signal is arranged to control of the adjustment of the first and second motors and not the first and second pumps.

14. A hydraulically driven tractor comprising:
a tractor frame;
an engine mounted on the tractor frame;
a cab mounted on the tractor frame for a tractor driver;
a first and a second driven wheels of the tractor mounted at a driven end of the tractor, the first driven wheel including a first hydraulic drive motor for driving the first wheel and the second driven wheel including a second hydraulic drive motor for driving the second wheel;
two non-driven castor wheels of the tractor mounted at a second end of the tractor;
the driven end having mounting assemblies for supporting a crop cutting header at a position in front of the driven end and in front of the cab when the driven end is forwards;
a first and a second hydraulic pump each driven by the engine for generating a source of hydraulic fluid under pressure;
the first hydraulic pump being arranged for driving the first hydraulic motor of the first driven wheel and the second hydraulic pump arranged for driving the second hydraulic motor of the second driven wheel;
the first hydraulic pump being operable to vary the displacement of the first hydraulic pump between a minimum and a maximum to vary the flow rate of fluid generated for supply to the first hydraulic motor as the first hydraulic pump is driven;
the second hydraulic pump being operable to vary the displacement of the second pump between a minimum and a maximum to vary the flow rate of fluid generated for supply to the second hydraulic motor as the second pump is driven;
the first hydraulic drive motor having a displacement control actuator which is operable by a control unit so as to provide continuous stepless adjustment of the displacement of the first hydraulic drive motor between a minimum and a maximum to vary a ground speed of the first driven wheel relative to a flow rate of the fluid supplied to the first hydraulic motor;
the second hydraulic drive motor having a displacement control actuator which is operable by a control unit so as to provide continuous stepless adjustment of the displacement of the second hydraulic drive motor between a minimum and a maximum to vary a ground speed of the second driven wheel relative to a flow rate of the fluid supplied to the second hydraulic motor;
a steering control operable to provide a steering output between left and right positions through a center position;
a speed control operable to provide a speed output between forward and reverse positions through a neutral position;
the speed control being arranged to vary the displacement of the first hydraulic pump and/or the first hydraulic motor to vary a ground speed of the first driven wheel;
the speed control being arranged to vary the displacement of the second hydraulic pump and/or the second hydraulic motor to vary a ground speed of the second driven wheel;
the speed control being arranged to vary the ground speed of the first and second driven wheels symmetrically to vary a common ground speed of the tractor;
the steering control being arranged to vary the displacement of the first hydraulic motor and/or the first hydraulic pump to vary a ground speed of the first driven wheel;
the steering control being arranged to vary the displacement of the second hydraulic motor and/or the second hydraulic pump to vary a ground speed of the second driven wheel;
the steering control being arranged to vary the ground speed of the first and second driven wheels differentially to cause steering of the tractor to a desired direction;
wherein braking of the forward speed of the tractor is effected by returning the speed control to a zero position;
and wherein the speed control and the displacement control actuators of the first and second motors are arranged so that the braking to halt is effected with the first and second motors at said maximum displacement.

15. A hydraulically driven tractor comprising:
a tractor frame;
an engine mounted on the tractor frame;
a cab mounted on the tractor frame for a tractor driver;
a first and a second driven wheels of the tractor mounted at a driven end of the tractor, the first driven wheel including a first hydraulic drive motor for driving the first wheel and the second driven wheel including a second hydraulic drive motor for driving the second wheel;
two non-driven castor wheels of the tractor mounted at a second end of the tractor;
the driven end having mounting assemblies for supporting a crop cutting header at a position in front of the driven end and in front of the cab when the driven end is forwards;

a first and a second hydraulic pump each driven by the engine for generating a source of hydraulic fluid under pressure;

the first hydraulic pump being arranged for driving the first hydraulic motor of the first driven wheel and the second hydraulic pump arranged for driving the second hydraulic motor of the second driven wheel;

the first hydraulic pump being operable to vary the displacement of the first hydraulic pump between a minimum and a maximum to vary the flow rate of fluid generated for supply to the first hydraulic motor as the first hydraulic pump is driven;

the second hydraulic pump being operable to vary the displacement of the second pump between a minimum and a maximum to vary the flow rate of fluid generated for supply to the second hydraulic motor as the second pump is driven;

the first hydraulic drive motor having a displacement control actuator which is operable by a control unit so as to provide continuous stepless adjustment of the displacement of the first hydraulic drive motor between a minimum and a maximum to vary a ground speed of the first driven wheel relative to a flow rate of the fluid supplied to the first hydraulic motor;

the second hydraulic drive motor having a displacement control actuator which is operable by a control unit so as to provide continuous stepless adjustment of the displacement of the second hydraulic drive motor between a minimum and a maximum to vary a ground speed of the second driven wheel relative to a flow rate of the fluid supplied to the second hydraulic motor;

a steering control operable to provide a steering output between left and right positions through a center position;

a speed control operable to provide a speed output between forward and reverse positions through a neutral position;

the speed control being arranged to vary the displacement of the first hydraulic pump and/or the first hydraulic motor to vary a ground speed of the first driven wheel;

the speed control being arranged to vary the displacement of the second hydraulic pump and/or the second hydraulic motor to vary a ground speed of the second driven wheel;

the speed control being arranged to vary the ground speed of the first and second driven wheels symmetrically to vary a common ground speed of the tractor;

the steering control being arranged to vary the displacement of the first hydraulic motor and/or the first hydraulic pump to vary a ground speed of the first driven wheel;

the steering control being arranged to vary the displacement of the second hydraulic motor and/or the second hydraulic pump to vary a ground speed of the second driven wheel;

the steering control being arranged to vary the ground speed of the first and second driven wheels differentially to cause steering of the tractor to a desired direction;

wherein the speed control and the displacement control actuators of the first and second motors are arranged such that the ratio of change of displacement of the first and second motors relative to the first and second pumps is different during acceleration than during deceleration.

16. A hydraulically driven tractor comprising:
a tractor frame;
an engine mounted on the tractor frame;
a cab mounted on the tractor frame for a tractor driver;
a first and a second driven wheels of the tractor mounted at a driven end of the tractor, the first driven wheel including a first hydraulic drive motor for driving the first wheel and the second driven wheel including a second hydraulic drive motor for driving the second wheel;

two non-driven castor wheels of the tractor mounted at a second end of the tractor;

the driven end having mounting assemblies for supporting a crop cutting header at a position in front of the driven end and in front of the cab when the driven end is forwards;

a first and a second hydraulic pump each driven by the engine for generating a source of hydraulic fluid under pressure;

the first hydraulic pump being arranged for driving the first hydraulic motor of the first driven wheel and the second hydraulic pump arranged for driving the second hydraulic motor of the second driven wheel;

the first hydraulic pump being operable to vary the displacement of the first hydraulic pump between a minimum and a maximum to vary the flow rate of fluid generated for supply to the first hydraulic motor as the first hydraulic pump is driven;

the second hydraulic pump being operable to vary the displacement of the second pump between a minimum and a maximum to vary the flow rate of fluid generated for supply to the second hydraulic motor as the second pump is driven;

the first hydraulic drive motor having a displacement which is continuously variable between a minimum and a maximum to vary a ground speed of the first driven wheel relative to a flow rate of the fluid supplied to the first hydraulic motor;

the second hydraulic drive motor having a displacement which is continuously variable between a minimum and a maximum to vary a ground speed of the second driven wheel relative to a flow rate of the fluid supplied to the second hydraulic motor;

a first steering control operable to provide a first steering output between left and right positions through a center position;

a second steering control independent of the first steering control operable to provide a second steering output between left and right positions through a center position;

a speed control operable to provide a speed output between forward and reverse positions through a neutral position;

the speed control being arranged to vary the displacement of the first hydraulic pump and/or the first hydraulic motor to vary a ground speed of the first driven wheel;

the speed control being arranged to vary the displacement of the second hydraulic pump and/or the second hydraulic motor to vary a ground speed of the second driven wheel;

the speed control being arranged to vary the ground speed of the first and second driven wheels symmetrically to vary a common ground speed of the tractor;

the first steering control being arranged to vary the displacement of the first hydraulic pump and not the first hydraulic motor to vary a ground speed of the first driven wheel;

the first steering control being arranged to vary the displacement of the second hydraulic pump and not the second hydraulic motor to vary a ground speed of the second driven wheel;

the first steering control being arranged to vary the ground speed of the first and second driven wheels differentially to cause steering of the tractor to a desired direction;

the second steering control being arranged to vary the displacement of the first hydraulic motor and not the first hydraulic pump to vary a ground speed of the first driven wheel;

the second steering control being arranged to vary the displacement of the second hydraulic motor and not the second hydraulic pump to vary a ground speed of the second driven wheel;

the second steering control being arranged to vary the ground speed of the first and second driven wheels differentially to cause steering of the tractor to a desired direction;

such that the tractor can be steered by the first steering control and by the second steering control independently of one another.

17. The tractor according to claim 16 wherein one of the first second steering controls is manually operable by the tractor driver and the other of the first second steering controls is operable in response to a signal from an automatic steering system.

18. The tractor according to claim 16 wherein the speed control is arranged to vary the displacement of both the first and second hydraulic pumps and the first and second hydraulic motors.

19. The tractor according to claim 16 wherein the speed control provides a first output to control displacement of the first and second motors and second output to control displacement of the first and second pumps.

20. The tractor according to claim 19 wherein one of the first and second outputs is an electrical signal generated by an electrical sensor detecting movement of the speed control and wherein the electrical signal is supplied to an electronic control system.

21. The tractor according to claim 20 wherein the other of the first and second outputs is provided by a mechanical link.

22. The tractor according to claim 20 wherein the electronic control system includes a program arranged so that the adjustment generated by said electrical signal is not directly proportional to a position of the speed control.

23. The tractor according to claim 20 wherein the adjustment generated by said electrical signal is arranged to control of the adjustment of the first and second motors and not the first and second pumps.

24. The tractor according to claim 20 wherein the first output causing adjustment of the first and second motors is arranged so that the first and second motors remain at maximum displacement for a first part of the adjustment of the speed control.

25. The tractor according to claim 20 wherein the first output causing adjustment of the first and second motors is arranged so that the first and second motors are arranged to reach only a set displacement less than the minimum displacement.

26. The tractor according to claim 25 wherein the set displacement is selectable by the tractor driver.

27. The tractor according to claim 25 wherein the tractor is operable in working and transport modes and wherein the first output causing adjustment of the first and second motors is arranged so that the first and second motors are prevented from reaching the minimum displacement in the working mode only so that the first and second motors reach the minimum displacement in the transport mode.

28. A hydraulically driven tractor comprising:
a tractor frame;
an engine mounted on the tractor frame;
a cab mounted on the tractor frame for a tractor driver;
a first and a second driven wheels of the tractor mounted at a driven end of the tractor, the first driven wheel including a first hydraulic drive motor for driving the first wheel and the second driven wheel including a second hydraulic drive motor for driving the second wheel;

two non-driven castor wheels of the tractor mounted at a second end of the tractor;

the driven end having mounting assemblies for supporting a crop cutting header at a position in front of the driven end and in front of the cab when the driven end is forwards;

a first and a second hydraulic pump each driven by the engine for generating a source of hydraulic fluid under pressure;

the first hydraulic pump being arranged for driving the first hydraulic motor of the first driven wheel and the second hydraulic pump arranged for driving the second hydraulic motor of the second driven wheel;

the first hydraulic pump being operable to vary the displacement of the first hydraulic pump between a minimum and a maximum to vary the flow rate of fluid generated for supply to the first hydraulic motor as the first hydraulic pump is driven;

the second hydraulic pump being operable to vary the displacement of the second pump between a minimum and a maximum to vary the flow rate of fluid generated for supply to the second hydraulic motor as the second pump is driven;

the first hydraulic drive motor having a displacement control actuator which is operable by a control unit so as to provide continuous stepless adjustment of the displacement of the first hydraulic drive motor between a minimum and a maximum to vary a ground speed of the first driven wheel relative to a flow rate of the fluid supplied to the first hydraulic motor;

the second hydraulic drive motor having a displacement control actuator which is operable by a control unit so as to provide continuous stepless adjustment of the displacement of the second hydraulic drive motor between a minimum and a maximum to vary a ground speed of the second driven wheel relative to a flow rate of the fluid supplied to the second hydraulic motor;

a steering control operable to provide a steering output between left and right positions through a center position;

a speed control operable to provide a speed output between forward and reverse positions through a neutral position;

the speed control being arranged to vary the displacement of the first hydraulic pump and/or the first hydraulic motor to vary a ground speed of the first driven wheel;

the speed control being arranged to vary the displacement of the second hydraulic pump and/or the second hydraulic motor to vary a ground speed of the second driven wheel;

the speed control being arranged to vary the ground speed of the first and second driven wheels symmetrically to vary a common ground speed of the tractor;

the steering control being arranged to vary the displacement of the first hydraulic motor and not the first hydraulic pump to vary a ground speed of the first driven wheel;

the steering control being arranged to vary the displacement of the second hydraulic motor and not the second hydraulic pump to vary a ground speed of the second driven wheel;

the steering control being arranged to vary the ground speed of the first and second driven wheels differentially to cause steering of the tractor to a desired direction.

\* \* \* \* \*